(12) United States Patent
Lu et al.

(10) Patent No.: US 11,184,238 B1
(45) Date of Patent: Nov. 23, 2021

(54) FLEXIBLE POLICY ENFORCEMENT AND ENABLEMENT IN A SOFTWARE DEFINED NETWORK WITH UNIFIED FEATURE OPERATIONS

(71) Applicant: Cisco Technology, Inc., San Jose, CA (US)

(72) Inventors: Mingzhe Lu, Fremont, CA (US); Hongqing Li, Sunnyvale, CA (US); Preety Mordani, Fremont, CA (US); Prabahar Radhakrishnan, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/080,406

(22) Filed: Oct. 26, 2020

Related U.S. Application Data (60) Provisional application No. 63/060,746, filed on Aug. 4, 2020.

(51) Int. Cl.
*G06F 15/177* (2006.01)
*H04L 12/24* (2006.01)

(52) U.S. Cl.
CPC ................... *H04L 41/0893* (2013.01)

(58) Field of Classification Search
CPC .................................................. H04L 41/0893
See application file for complete search history.

(56) References Cited

FOREIGN PATENT DOCUMENTS

| CN | 108768714 A | 11/2018 |
|---|---|---|
| CN | 110995514 A | 4/2020 |
| WO | WO 2015027374 A1 | 3/2015 |

OTHER PUBLICATIONS

Zheng Cai, "Maestro: Achieving Scalability and Coordination in Centralized Network Control Plane.", Aug. 2011.
X. Foukas, et al., "FlexRAN: A Flexible and Programmable Platform for Software-Defined Radio Access Networks," www.eurecom.fr, Aug. 18, 2020.

*Primary Examiner* — Wing F Chan
*Assistant Examiner* — Joseph R Maniwang
(74) *Attorney, Agent, or Firm* — Baker Botts, LLP (57) ABSTRACT

The present disclosure is directed to unified feature operations, and includes methods comprising receiving, for each of one or more actions that have been defined and downloaded to a data plane, registration information for registering each of the one or more actions, wherein the registration information includes an action handle for identifying a registered action of one or more registered actions; receiving a query from an application module having a composite action comprising at least one custom action to determine if the at least one custom action corresponds to at least one registered action; and in response to determining that the at least one custom action corresponds to at least one registered action, transmitting to the application module at least one action handle corresponding to the at least one registered action, wherein the at least one action handle is used to create a composite action package in the data plane.

20 Claims, 4 Drawing Sheets

FLEXIBLE POLICY ENFORCEMENT AND ENABLEMENT IN A SOFTWARE DEFINED NETWORK WITH UNIFIED FEATURE OPERATIONS

CROSS-REFERENCE TO RELATED APPLICATIONS

This application claims priority to and the benefit of co-pending U.S. Provisional Application No. 63/060,746, filed on Aug. 4, 2020, which application is incorporated herein by reference in its entirety.

TECHNICAL FIELD

The present disclosure generally relates to policy enforcement, and more specifically to flexible policy enforcement and enablement in a software defined network with unified feature operations.

BACKGROUND

Network policies play an important role in providing scalable and manageable networks. However, deploying these policies in software defined networks is challenging. Current advanced network devices typically support multiple features, such as Access Control Lists (ACLs), Quality of Service (QoS) parameters, and firewalls. In all these features, various types of traffic are treated with different operations. The number of feature operations is large in high end network devices. Efficient implementation and management of these operations may be challenging, both in terms of development efforts, as well as the requirements to system resources.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including receiving, for each of one or more actions that have been defined and downloaded to a data plane, registration information for registering each of the one or more actions, wherein the registration information comprises an action handle for identifying a registered action of one or more registered actions; receiving a query from an application module having a composite action comprising at least one custom action, the query for determining if the at least one custom action corresponds to at least one registered action of the one or more registered actions; and in response to determining that the at least one custom action corresponds to the at least one registered action, transmitting to the application module at least one action handle corresponding to the at least one registered action, wherein the at least one action handle is used to create a composite action package in the data plane.

Moreover, the action handle may comprise information pointing to a location of the registered action in the data plane. Additionally, the determination that the at least one custom action corresponds to the at least one registered action is based on the registration information. Furthermore, the at least one custom action of the composite action package may be invoked in the data plane using the at least one action handle. Also, the at least one custom action of the composite action may be defined by a user. Additionally, the operations may include making available the one or more registered actions across a plurality of network devices. Also, the operations may include storing the one or more registered actions at a network controller for download by one or more network devices.

According to another embodiment, a method may include the steps of receiving, for each of one or more actions that have been defined and downloaded to a data plane, registration information for registering each of the one or more actions, wherein the registration information comprises an action handle for identifying a registered action of one or more registered actions; receiving a query from an application module having a composite action comprising at least one custom action, the query for determining if the at least one custom action corresponds to at least one registered action of the one or more registered actions; and in response to determining that the at least one custom action corresponds to the at least one registered action, transmitting to the application module at least one action handle corresponding to the at least one registered action, wherein the at least one action handle is used to create a composite action package in the data plane.

According to yet another embodiment, one or more computer-readable non-transitory storage media may embody instructions that, when executed by a processor, cause the performance of operations, including receiving, for each of one or more actions that have been defined and downloaded to a data plane, registration information for registering each of the one or more actions, wherein the registration information comprises an action handle for identifying a registered action of one or more registered actions; receiving a query from an application module having a composite action comprising at least one custom action, the query for determining if the at least one custom action corresponds to at least one registered action of the one or more registered actions; and in response to determining that the at least one custom action corresponds to the at least one registered action, transmitting to the application module at least one action handle corresponding to the at least one registered action, wherein the at least one action handle is used to create a composite action package in the data plane.

Technical advantages of certain embodiments of this disclosure may include one or more of the following. The systems and methods described herein provide for a centralized action management module that may allow for flexible policy enforcement and enablement, custom action enablement, simplified policy distribution, and quick feature portability.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The software-defined network (SDN) is a logical network built on top of a physical network. While traffic is forwarded by the physical network, the software-based application layer is a logical network that provides an abstraction layer for the underlying network hardware. Because the application layer is based in logic, it is decoupled and independent of the underlying physical network.

While the decoupling of the logical network and underlying physical network offers numerous advantages to SDN architecture, it also creates challenges in the way network policies are defined and utilized. In current SDN architecture, a policy is defined by an application based on the logical network and/or abstraction layer, but the enforcement of the policy is performed at the physical network. Since the mapping between the logical network and physical network is dynamic, it is important that the control layer remains capable of transforming any application policy configuration based on the physical network, and that network devices are flexible to accommodate various policy combinations. However, in conventional SDN implementations, the policy configured by users is rigidly associated with the specific user traffic flows and targets. There is a need for a mechanism that enables flexible policy enforcement in the physical network so that multiple traffic flows and multiple actions may be handled simultaneously from multiple targets.

The present disclosure proposes a mechanism for unified feature operations using a centralized action manager, so that features may define their operations (also referred to as "actions"), register their actions, and make available the defined and registered actions for use by any other application at any point in time. The result is a dynamic mechanism that enables the creation of customized and composite actions, flexible enforcement, reutilization of defined actions, and elimination of rigid action management.

Figure 1:
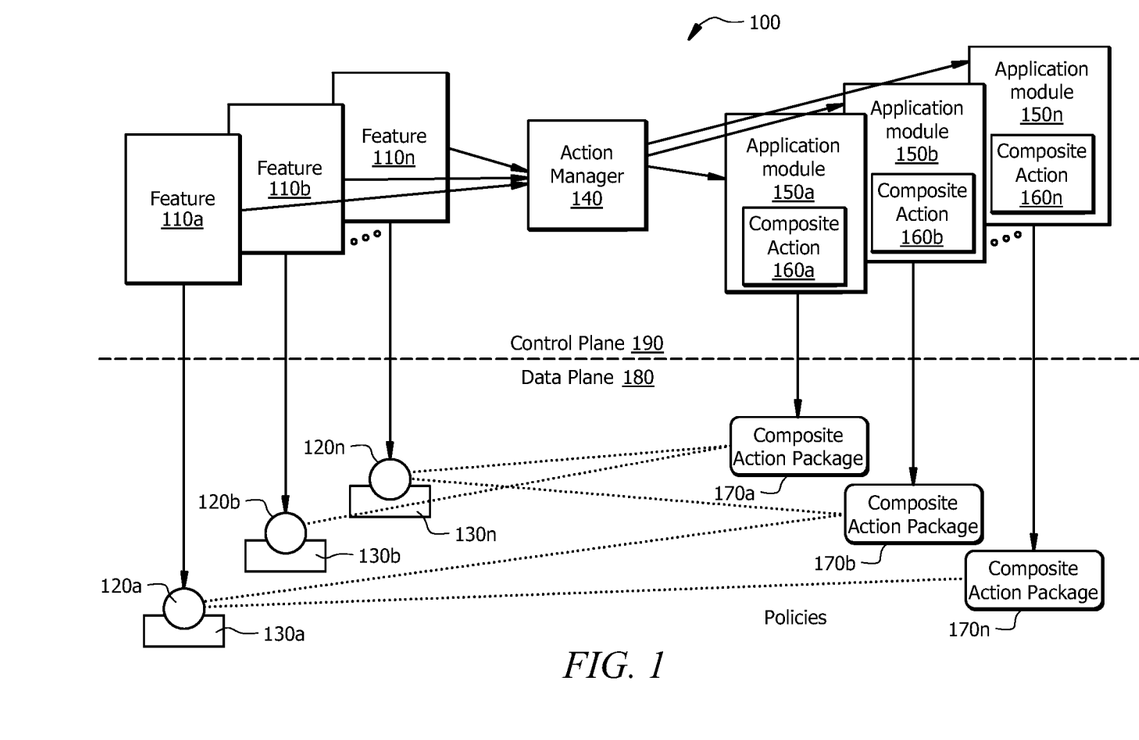
FIG. 1 illustrates a system for unified feature operations using centralized action management, in accordance with certain embodiments.

Reference is now made to FIG. 1, wherein is illustrated a system 100 for unified feature operations using centralized action management, in accordance with the present disclosure. System 100 includes one or more features 110a-n. Features 110a-n may include, by way of example and not limitation, ACLs, QoS, firewall, and any other features supported in SDN. Each feature 110a, 110b, 110n may be associated with at least one operation or action 120, 120b, 120n that may be taken on an object. Actions may include, by way of example, traffic priority actions, bandwidth actions, etc., that may be taken on objects such as virtual private networks (VPNs), virtual routing and forwarding (VRF) technologies, and various other interfaces and flows. In a ACL feature, actions may include, e.g., "permit" and "deny" actions. In a firewall feature, actions may include, e.g., "pass," "drop," and "inspect" actions. In an embodiment, the actions 120a-n may all be in a unified format; this may allow the actions 120a-n to be manageable and exchangeable, so that they may be interpreted by various modules.

In accordance with the present disclosure, each feature (e.g., 110a, 110b, 110n) of the one or more features 110a-n may have at least one associated action (e.g., 120a, 120b, 120n, respectively) that is defined by and created inside the feature 110a, 110b, 110n. Thus, in a system 100 having one or more features 110a-n, the one or more features 110a-n may define and create one or more actions 120a-n, each action (e.g., 120a) corresponding to an associated feature (e.g., 110a). Three features 110a, 110b, 110n are shown in FIG. 1, and each feature is shown to be associated with an action 120a, 120b, 120n, but it is to be understood that system 100 may include any number of features, each feature having at least one associated action (although it may have more than one associated action).

Each feature 110a, 110b, 110n may download its feature-specific action(s) 120a, 120b, 120n, respectively, to a corresponding network device 130a, 130b, 130b, respectively, in the data plane 180. Network devices may include, by way of example and not limitation, routers, switches, access points, controllers, and/or any other physical device required for communication and interaction between hardware on a network. For purposes of simplifying the illustration, system 100 may be hereafter described in conjunction with feature 110a and its associated action 120a, but it is to be understood that the description of system 100 may apply to any of the features 110a-n and their associated actions 120a-n.

After feature 110a defines and downloads its associated action 120a to a corresponding network device, feature 110a may then register its associated action 120a with a central action manager 140. The action manager 140 may comprise a centralized module residing in a control plane 190. In an embodiment, the action manager may be locally configured and may comprise a module housed locally inside a network device. In another embodiment (described further in conjunction with FIG. 2), the action manager may be configured across a network and may comprise a module housed inside a network controller accessible across a network. By "registering" its associated action 120a, feature 110a may provide to the action manager 140 registration information that may include a unique "feature ID", a unique "action ID", an action name, and a handle to the action 120a (also referred to as "action handle) in the data plane 180. The feature ID, which may be specific to the feature 110a and used to identify feature 110a, may be stored in the action manager 140. Likewise, the action ID may comprise a numeric identifier assigned to index/address the action 120a. The action ID may be specific to the associated action 120a and may be stored in the action manager 140. The action ID may also be used in the initialization (i.e., creation), processing (i.e., invocation), and cleanup (i.e., deletion) of that action at any point in time. Next, the action name may refer to a string to reference the action 120a, e.g., "permit", "drop", "set dscp", etc., and may also be stored in the action manager 140. Finally, the action handle is a means for addressing the action 120a in the data plane 180, and may comprise a function pointer or an index of the function array in the data plane 180. In other words, the action handle comprises information and/or a mechanism for pointing to the location of a registered action in the data plane 180, and specifically, for pointing to the network device 130a on which the registered action 120a is downloaded in the data plane 180. After a feature 110a downloads an action 120a to the data plane 180, the data plane 180a may provide the action handle to the feature 110a. The feature 110a may then transmit the action handle for storage to the action manager 140. The action handle includes, inter alia, information relating to the specific network device (e.g., 130a) on which it associated action 120a is downloaded. Together, the feature ID, the action ID, action name, and the action handle for a given feature/action coupling may comprise registration information to identify and later reference the particular registered action 120a and its corresponding feature 110a, and may be stored in the action manager 140.

With continued reference to FIG. 1, an application module (e.g., 150*a*, 150*b*, 150*n*) having a composite set of action configurations, referred to as a "composite action", may be received from a user in the control plane 190. Three application modules 150*a*, 150*b*, 150*n*, each having an associated composite action 160*a*, 160*b*, 160*n*, respectively, are shown in FIG. 1, but it is to be understood that system 100 may include any number of application modules, each having at least one composite action. In an embodiment, a composite action may comprise one or more custom actions associated with an application. For example, an application module 150*a* may define a composite action 160*a* comprising two custom actions, e.g., "drop" and "forward." The custom actions may correspond to actions that have been registered by one or more features 110*a*-*n* in the action manager 140.

The application module 150*a* may query the action manager 140 to determine whether the one or more custom actions associated with its composite action 160*a* correspond to actions that are registered with the action manager 140. If the one or more custom actions of the composite action 160*a* correspond to actions that have been registered with the action manager 140 (as determined based on a match between the action name and/or action ID of a custom action and the action name and/or action ID of a registered action), then the action manager 140 may respond to the application module 150*a* by retrieving and transmitting the action handle(s) associated with the corresponding registered actions (and that would correspond to the one or more custom actions of the composite action 160*a*). The application module 150*a*, having referenced the action manager 140 to obtain the action handles corresponding to the custom actions, may then create a composite action package 170*a* based on the action handle(s) obtained from the action manager 140, and may download and/or store the action handle(s) in the composite action package 170*a* in the data plane 180. By way of example, FIG. 1 shows three composite action packages 170*a*, 170*b*, 170*n*, each composite action package 170*a*, 170*b*, 170*n* created by a corresponding application module 150*a*, 150*b*, 150*n*, respectively.

When processing traffic in the data plane 180, the application module 150*a* may perform the custom actions of its composite action 160 from the composite action package 170*a* in the data plane 180 using the downloaded action handles. Specifically, as illustrated in FIG. 1, application module 150*a* having composite action package 160*a* comprising two custom actions (corresponding to registered actions 120*b*, 120*n*) may use the downloaded action handles to invoke those custom actions directly from the devices 130*b*, 130*n* on which they are downloaded in the data plane 180. Similarly, application module 150*b* having composite action package 160 comprising two custom actions (corresponding to registered actions 120*a*, 120*n*), may invoke those custom actions directly from the devices 130*a*, 130*n* on which they are downloaded. Application module 150*n* has a composite action package comprising one custom action (corresponding to registered action 120*a*), and may invoke that custom action from device 130*a*.

In an embodiment, and if necessary, the initialization callback function of a feature 110*a*, 110*b*, 110*n* may be invoked when an application module 150*a*, 150*b*, 150*n* references a registered action. Likewise, a cleanup callback function may also be invoked when the application module 150*a*, 150*b*, 150*n* removes the referenced and registered action. In another embodiment, when handling traffic, a processing callback function may be invoked along with the action handle and packet attributes as input parameters. The operations implemented in a feature may be executed to process the packet.

Figure 2:
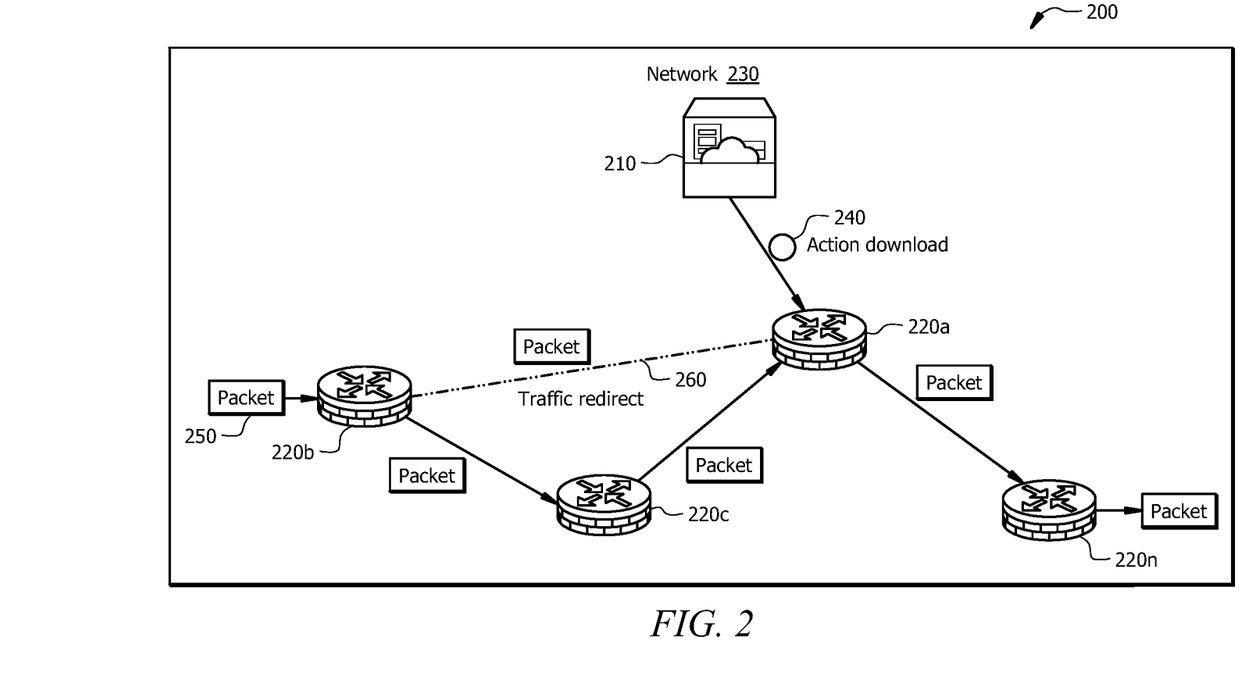
FIG. 2 illustrates a system for unified feature operations using centralized action management in a network configuration, in accordance with certain embodiments.

Reference is now made to FIG. 2, wherein is shown a system 200 of unified feature operations configured across a network, according to the present disclosure. In an embodiment, unified feature actions may operate as a service, and may be made available across a network 230 spanning a plurality of devices 220*a*, 220*b*, 220*c*, 220*n* (collectively, 220-*n*). For example, as shown in FIG. 2, an action manager (not shown) may reside in a network controller 210. One or more feature actions 240 may be registered with the action manager and may be downloaded from the network controller 210 to at least one network device 220*a*. The geolocation information and availability of the downloaded one or more feature actions 240 may be shared by the controller 210 with the plurality of network devices 220*b*, 220*c*, 220*n*.

In one embodiment, and by way of example, a network device 220*b* may be a gateway device handling a large amount of traffic and may receive a packet 250. Network device 220*b* may require an external feature action 240 to complete the processing of the packet 250. However, in order to maintain the processing speed required to serve as a gateway, network device 220*b* may offload the feature action 240 to another network device 220*a*. Thus, packet 250 (and any other traffic requiring feature action 240) which is received at network device 220*b* may be redirected to network device 220*a* onto which the feature action 240 has been downloaded and resides, so that the feature action 240 may be performed on the packet 250. As such, this service may consider performance and other factors, such as load balancing, to determine whether to redirect traffic. In another embodiment, the network device 220*b* may not redirect the received packet 250, but instead, may send only the packet information (e.g., packet attribute information, such as IP addresses, ports, etc.) to the network device 220*a*.

In other embodiments, the feature action results may be cached in network devices for later use, similar to memory cache. This may be an optimization to increase the action processing speed.

Figure 3:
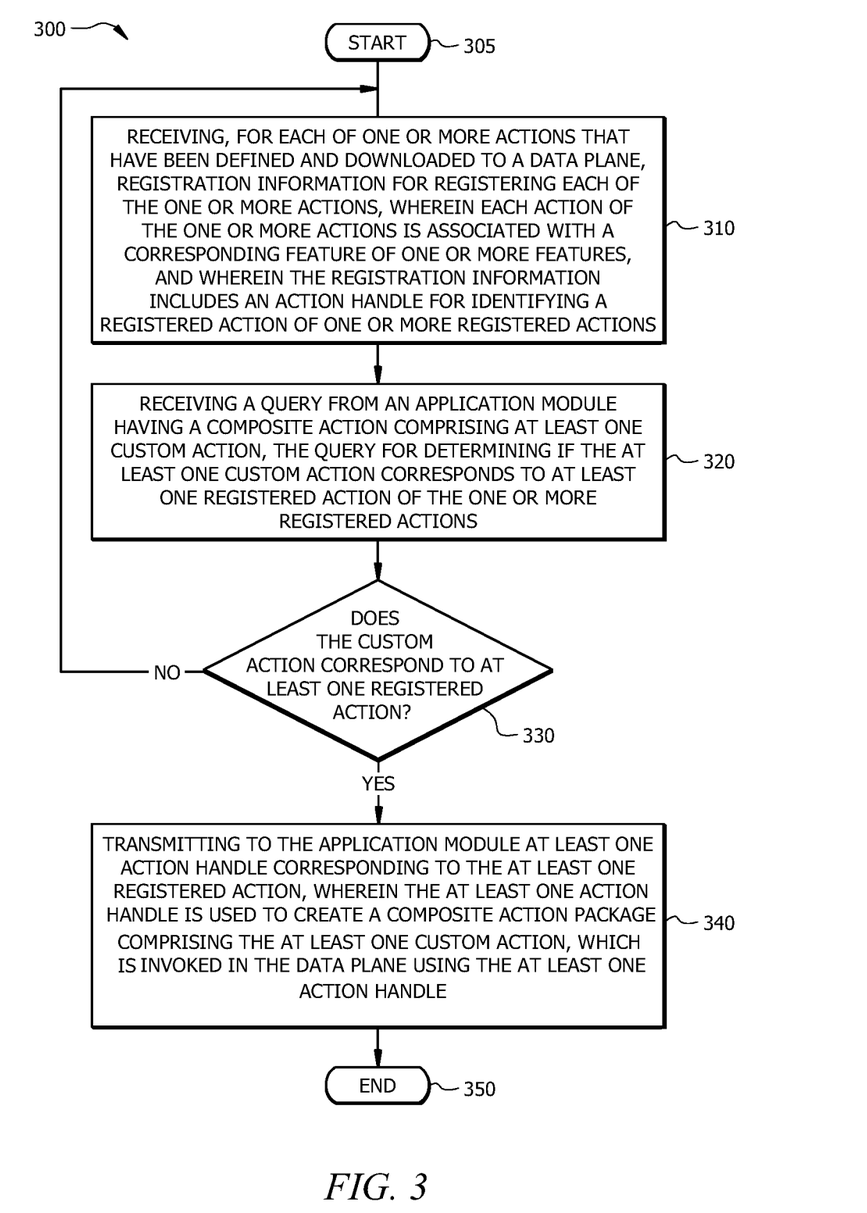
FIG. 3 illustrates a flow diagram of a method for unified feature operations using centralized action management, in accordance with certain embodiments.

Reference is now made to FIG. 3, wherein is shown a flow diagram of a method 300 for unified feature operations using centralized action management, in accordance with the present disclosure. The steps of method 300 may be in accord with the operations outlined in conjunction with the systems 100 and 200 of FIGS. 1 and 2. As such, similar and corresponding terms described in conjunction with FIGS. 1 and 2 may have the same meaning when used in conjunction with method 300 of FIG. 3. Additionally, the present disclosure incorporates by reference the descriptions of the unified feature operations of systems 100 and 200 for the purposes of explaining, expounding upon, or otherwise clarifying the steps of method 300. In an embodiment, the steps of method 300 may be carried out by a centralized action manager, as shown and described in conjunction with the systems 100 and 200 of FIGS. 1 and 2. However, the present disclosure is not to be so limited, and it is to be understood that method 300 may be performed by any component, element, or device, as understood by one of ordinary skill in the art.

Because method 300 is generally described from the perspective of a centralized action manager, the following describes additional components and/or operations that may be carried out by these additional components prior to the commencement of the method 300. For example, method 300 presupposes the existence of one or more features. Features may include, by way of example and not limitation, ACLs, QoS, firewall, and any other features supported in SDN. Each feature may be associated with at least one (and may include more than one) action that may be taken on an object. Actions may include, by way of example, traffic priority actions, bandwidth actions, etc., that may be taken on objects such as VPNs, VRF technologies, and various other interfaces and flows. In a ACL feature, actions may include, e.g., "permit" and "deny" actions. In a firewall feature, actions may include, e.g., "pass," "drop," and "inspect" actions. In an embodiment, the actions may all be in a unified format; this may allow the actions to be manageable and exchangeable, so that they may be interpreted by various modules.

In accordance with the present disclosure, each feature of the one or more features may define and create at least one action inside the feature. Each feature may then download its associated action(s) to a corresponding network device in the data plane. Network devices may include, by way of example and not limitation, routers, switches, access points, controllers, and/or any other physical device required for communication and interaction between hardware on a network.

The method 300 may then begin at step 305. At step 310, an action manager may receive, for each of one or more actions that have been defined and downloaded to the data plane, registration information for registering each of the one or more actions, wherein each action of the one or more actions is associated with a corresponding feature of the one or more features. More specifically, each feature may register its associated action(s) with the action manager. The action manager may comprise a centralized module residing in a control plane. In an embodiment, the action manager may be locally configured and may comprise a module housed locally inside a network device. In another embodiment, the action manager may be configured across a network and may comprise a module housed inside a network controller accessible across a network. By "registering" its associated action(s), each feature may provide to the action manager registration information for each of its associated actions. Registration information may include a unique feature ID associated with the feature, a unique action ID associated with the action, an action name, and an action handle.

The feature ID, which may be specific to a given feature, is used to identify the feature. Likewise, the action ID may comprise a numeric identifier assigned to index/address the action. The action ID may be specific to the associated action and may be used in the initialization (i.e., creation), processing (i.e., invocation), and cleanup (i.e., deletion) of that action at any point in time. Next, the action name may refer to a string to reference the action. e.g., "permit", "drop", "set dscp", etc. Finally, the action handle is a means for addressing the action in the data plane, and may comprise a function pointer or an index of the function array in the data plane. In other words, the action handle comprises information and/or a mechanism for pointing to the location of a registered action in the data plane, and specifically, for pointing to the network device on which the registered action is downloaded in the data plane. Each of these registration information elements (feature ID, action ID, action name, and action handle) associated with a feature/action coupling may be stored in the action manager.

At step 320, a query may be received by the action manager from an application module. The application module may be associated with and/or have a composite action comprising at least one custom action. In other words, the composite action of the application module may comprise one or more custom actions. In an embodiment, custom actions of a composite action may be defined by a user. The custom actions may correspond to one or more of the actions registered in the action manager. The application module may query the action manager to determine whether the at least one custom action of the composite action corresponds to at least one action registered in the action manager.

At step 330, a determination may be made as to whether the at least one custom action of the composite action corresponds to at least one registered action of the one or more registered actions, i.e., whether the custom action(s) corresponds to the action(s) registered with the action manager. If, at step 330, it is determined that the at least one custom action does not correspond to at least one of the registered one or more actions, the method may return to step 310, wherein registration information is received for registering one or more actions with an action manager. If, however, at step 330, it is determined that the at least one custom action corresponds to at least one registered action, the method may proceed to step 340.

At step 340, the action manager may retrieve and transmit to the application module at least one action handle corresponding to the at least one registered action that corresponds to the at least one custom action. The at least one action handle may then be used to create a composite action package in the data plane. The at least one action handle may also be stored in the composite action package in the data plane. The at least one custom action (which corresponds to an registered action that has been previously downloaded to the data plane) may then be invoked by the composite action package in the data plane using the at least one action handle. In other words, the application module may invoke the at least one custom action directly from the network device on which the corresponding registered action has been downloaded in the data plane using the at least one action handle, which acts as a pointer to point to the location of a registered action in the data plane. The method may end at step 350.

Although the present disclosure describes and illustrates particular steps of method 300 as occurring in a particular order, this disclosure contemplates any suitable steps of the method 300 occurring in any suitable order. Moreover, although this disclosure describes and illustrates particular components, devices or system carrying out the steps of method 300, it is be understood that this disclosure contemplates any suitable components or combination of components, devices, or systems carrying out the steps of method 300.

The centralized action manager may bring great flexibility to policy enforcement. With the proposed system, users may define any composite action comprising any number of constituent custom actions, and as long as the custom actions are registered in the action manager with appropriate action handles, the user may borrow, reuse and improvise on those actions. As a result, the rigidity of policy actions is minimized, allowing for an open system that is not tied to any particular objects.

The present disclosure is designed to address a number of limitations in SDN and software-defined wide area network (SDWAN) architectures. First, in the basic SDN architecture, the control plane dictates network behaviors and configures network devices via a set of flow rules that control network traffic flows. The control plane also facilitates the flow base policy enablement. These mechanisms are conventionally rigid, i.e., they require associating policies with a fixed set of objects (e.g., interface, VPN, VRF, etc.) and include no flexibility in allowing the user to decouple the objects from the policies. The systems and methods of the present disclosure enables the association of a policy with any construct, whether it be logical or physical, thereby increasing the flexibility of policy enforcement.

Second, since SDWAN architectures do not allow for a one-to-one mapping relationship between a control plane and a data plane, policies must be carved into many parts and distributed to network devices. The action manager of the present disclosure provides a centralized repository of actions which may be accessed from the control plane and/or the data plane.

Third, as traffic increases in a network, the number of corresponding feature actions will also be significant. Therefore, an efficient administration of the various feature actions is essential. Conventional architecture provides no flexibility for users to define or combine actions to create a custom action in the software. The systems and methods of the present disclosure allow for the creation and/or combination of actions, e.g., such as counter and forward, into a single customized action, resulting in more options for the user.

Fourth, the way networks are designed and used has been changed from network access to services provided to individual entities. This fundamental shift in the way networks are viewed requires the changes in network policy implementation. The present disclosure allows for a mechanism that, rather than being specific to a given hardware platform, allows for the availability of a set of interoperable, interchangeable network policy implementations that are useful for service oriented networks, such as SDWAN.

Finally, another limitation of SDN and SDWAN is the rigid operation of [explain this limitation]. The present disclosure facilitates the SDWAN policy implementation by using the unified feature operation interface data format. The unified operation interface data format allows feature implementation to become portable, thereby enabling features to be adopted in various SDWAN platforms.

Figure 4:
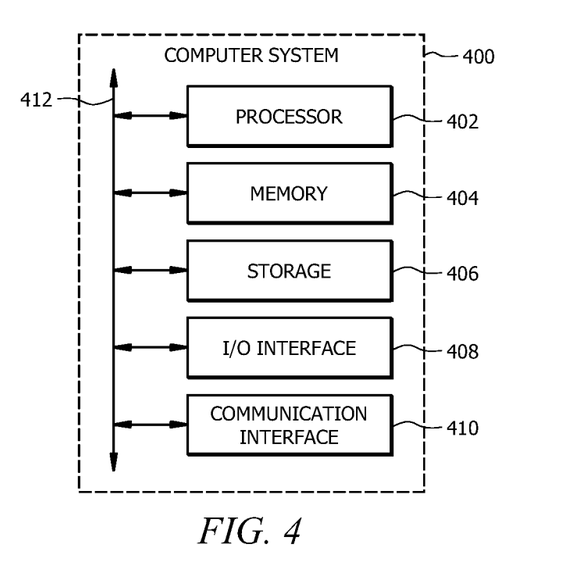
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media comprising instructions that, when executed by the one or more processors, cause one or more components of the system to perform operations comprising:
receiving, for each of one or more actions that have been defined and downloaded to a data plane, registration information for registering each of the one or more actions, wherein the registration information includes an action handle for identifying a registered action of one or more registered actions;
receiving a query from an application module having a composite action comprising at least one custom action, the query for determining if the at least one custom action corresponds to at least one registered action of the one or more registered actions; and
in response to determining that the at least one custom action corresponds to the at least one registered action, transmitting to the application module at least one action handle corresponding to the at least one registered action, wherein the at least one action handle is used to create a composite action package comprising the at least one custom action in the data plane.

2. The system of claim 1, wherein the action handle comprises information pointing to a location of the registered action in the data plane.

3. The system of claim 1, wherein the determination that the at least one custom action corresponds to the at least one registered action is based on the registration information.

4. The system of claim 1, wherein the at least one custom action of the composite action package is invoked in the data plane using the at least one action handle.

5. The system of claim 1, wherein the at least one custom action of the composite action is defined by a user.

6. The system of claim 1, the operations further comprising:
making available the one or more registered actions across a plurality of network devices.

7. The system of claim 6, the operations further comprising:
storing the one or more registered actions at a network controller for download by one or more network devices.

8. A method, comprising:
receiving, for each of one or more actions that have been defined and downloaded to a data plane, registration information for registering each of the one or more actions, wherein the registration information includes an action handle for identifying a registered action of one or more registered actions;
receiving a query from an application module having a composite action comprising at least one custom action, the query for determining if the at least one custom action corresponds to at least one registered action of the one or more registered actions; and
in response to determining that the at least one custom action corresponds to the at least one registered action, transmitting to the application module at least one action handle corresponding to the at least one registered action, wherein the at least one action handle is used to create a composite action package in the data plane.

9. The method of claim 8, wherein the action handle comprises information pointing to a location of the registered action in the data plane.

10. The method of claim 8, wherein the determination that the at least one custom action corresponds to the at least one registered action is based on the registration information.

11. The method of claim 8, wherein the at least one custom action of the composite action package is invoked in the data plane using the at least one action handle.

12. The method of claim 8, wherein the at least one custom action of the composite action is defined by a user.

13. The method of claim 8, further comprising:
making available the one or more registered actions across a plurality of network devices.

14. The method of claim 13, further comprising:
storing the one or more registered actions at a network controller for download by one or more network devices.

15. One or more computer-readable non-transitory storage media embodying instructions that, when executed by a processor, cause performance of operations comprising:
receiving, for each of one or more actions that have been defined and downloaded to a data plane, registration information for registering each of the one or more actions, wherein the registration information includes an action handle for identifying a registered action of one or more registered actions;
receiving a query from an application module having a composite action comprising at least one custom action, the query for determining if the at least one custom action corresponds to at least one registered action of the one or more registered actions; and
in response to determining that the at least one custom action corresponds to the at least one registered action, transmitting to the application module at least one action handle corresponding to the at least one registered action, wherein the at least one action handle is used to create a composite action package in the data plane.

16. The one or more computer-readable non-transitory storage media of claim 15, wherein the action handle comprises information pointing to a location of the registered action in the data plane.

17. The one or more computer-readable non-transitory storage media of claim 15, wherein the determination that the at least one custom action corresponds to the at least one registered action is based on the registration information.

18. The one or more computer-readable non-transitory storage media of claim 15, wherein the at least one custom action of the composite action package is invoked in the data plane using the at least one action handle.

19. The one or more computer-readable non-transitory storage media of claim 15, wherein the at least one custom action of the composite action is defined by a user.

20. The one or more computer-readable non-transitory storage media of claim 15, the operations further comprising:
making available the one or more registered actions across a plurality of network devices.

\* \* \* \* \*